(12) United States Patent
Kotecha et al.

(10) Patent No.: US 9,215,569 B2
(45) Date of Patent: Dec. 15, 2015

(54) BROADCAST MEDIA CONTENT TO SUBSCRIBER GROUP

(71) Applicants: Verizon Patent and Licensing Inc., Arlington, VA (US); Cellco Partnership, Arlington, VA (US)

(72) Inventors: Lalit R. Kotecha, San Ramon, CA (US); Yee Sin Chan, San Jose, CA (US); Patricia R. Chang, San Ramon, CA (US); Mingxing S. Li, San Jose, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 333 days.

(21) Appl. No.: 13/834,512

(22) Filed: Mar. 15, 2013

(65) Prior Publication Data

US 2014/0269437 A1    Sep. 18, 2014

(51) Int. Cl.
| | |
|---|---|
| H04W 4/06 | (2009.01) |
| H04W 4/24 | (2009.01) |
| H04M 15/06 | (2006.01) |
| H04M 15/00 | (2006.01) |
| H04W 28/02 | (2009.01) |
| H04L 12/851 | (2013.01) |

(52) U.S. Cl.
CPC ............... *H04W 4/06* (2013.01); *H04L 47/24* (2013.01); *H04M 15/06* (2013.01); *H04M 15/58* (2013.01); *H04W 4/24* (2013.01); *H04W 28/0289* (2013.01)

(58) Field of Classification Search
CPC ..... H04W 4/06; H04W 4/24; H04W 28/0289; H04M 15/58; H04M 15/06; H04L 47/24
See application file for complete search history.

(56) References Cited

U.S. PATENT DOCUMENTS

| | | | |
|---|---|---|---|
| 2007/0220163 A1* | 9/2007 | Khouderchah et al. | 709/231 |
| 2012/0093153 A1* | 4/2012 | Phan et al. | 370/390 |
| 2012/0263089 A1* | 10/2012 | Gupta et al. | 370/312 |
| 2013/0111520 A1* | 5/2013 | Lo et al. | 725/35 |
| 2013/0246631 A1* | 9/2013 | Gonzales et al. | 709/227 |
| 2014/0195651 A1* | 7/2014 | Stockhammer et al. | 709/219 |
| 2014/0222962 A1* | 8/2014 | Mao et al. | 709/219 |
| 2014/0229529 A1* | 8/2014 | Barone et al. | 709/203 |

* cited by examiner

*Primary Examiner* — Jay P Patel

(57) ABSTRACT

A system includes a network device receives a request for media content from a plurality of user devices and transmits the media content in accordance with at least one of a unicast mode and a broadcast mode. A content monitoring device counts a number of requests for the media content received at the network device and selects the mode of the network device based on the number of requests received. A method includes receiving a request for media content from a plurality of user devices, counting a number of requests for media content received at the network device, selecting at least one of a unicast mode and a broadcast mode of the network device based on the number of requests received at the network device, and transmitting the media content in accordance with the selected mode.

23 Claims, 4 Drawing Sheets

BROADCAST MEDIA CONTENT TO SUBSCRIBER GROUP

BACKGROUND

The Multimedia Broadcast Multicast Service (MBMS) is a specification that allows for the transmission of information to multiple user devices from a particular network device, such as a cell site. MBMS can be used to provide broadcast and multicast services to certain cellular networks, such as 3G networks. A more recent version of the MBMS specification is the Evolved Mobile Broadcast Multicast Service (eMBMS), which provides broadcast and multicast services to telecommunication networks such as the Long Term Evolution (LTE) network.

DETAILED DESCRIPTION

An exemplary system includes a network device that receives a request for media content from a plurality of user devices and transmits the media content in accordance with at least one of a unicast mode and a broadcast mode. A content monitoring device counts a number of requests for the media content received at the network device and selects the mode of the network device based on the number of requests received. An exemplary method includes receiving a request for media content from a plurality of user devices, counting a number of requests for media content received at the network device, selecting at least one of a unicast mode and a broadcast mode of the network device based on the number of requests received at the network device, and transmitting the media content in accordance with the selected mode.

A large number of requests for a particular instance of media content may represent the popularity of the media content. Certain efficiencies may be gained by broadcasting the media content (e.g., operating the network device in broadcast mode) instead of transmitting the media content directly to each device that requests the media content (e.g., operating the network device in unicast mode). Moreover, the broadcast of the media content may be according to a schedule and may consider various network conditions to further maximize network resources when delivering the requested media content.

Figure 1A:
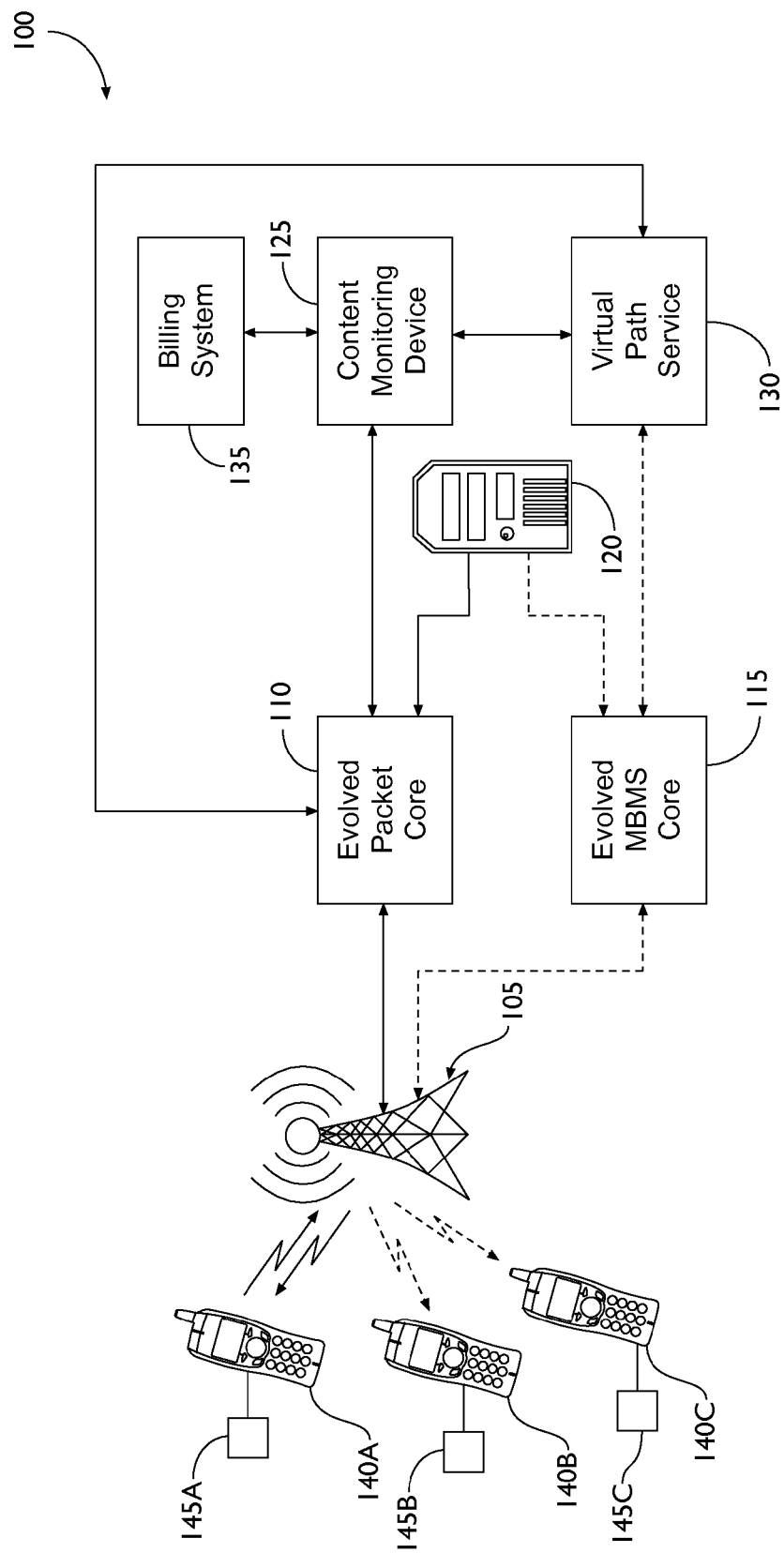
FIGS. 1A and 1B illustrate an exemplary system for providing unicast and broadcast services to a telecommunication network.
Figure 1B:
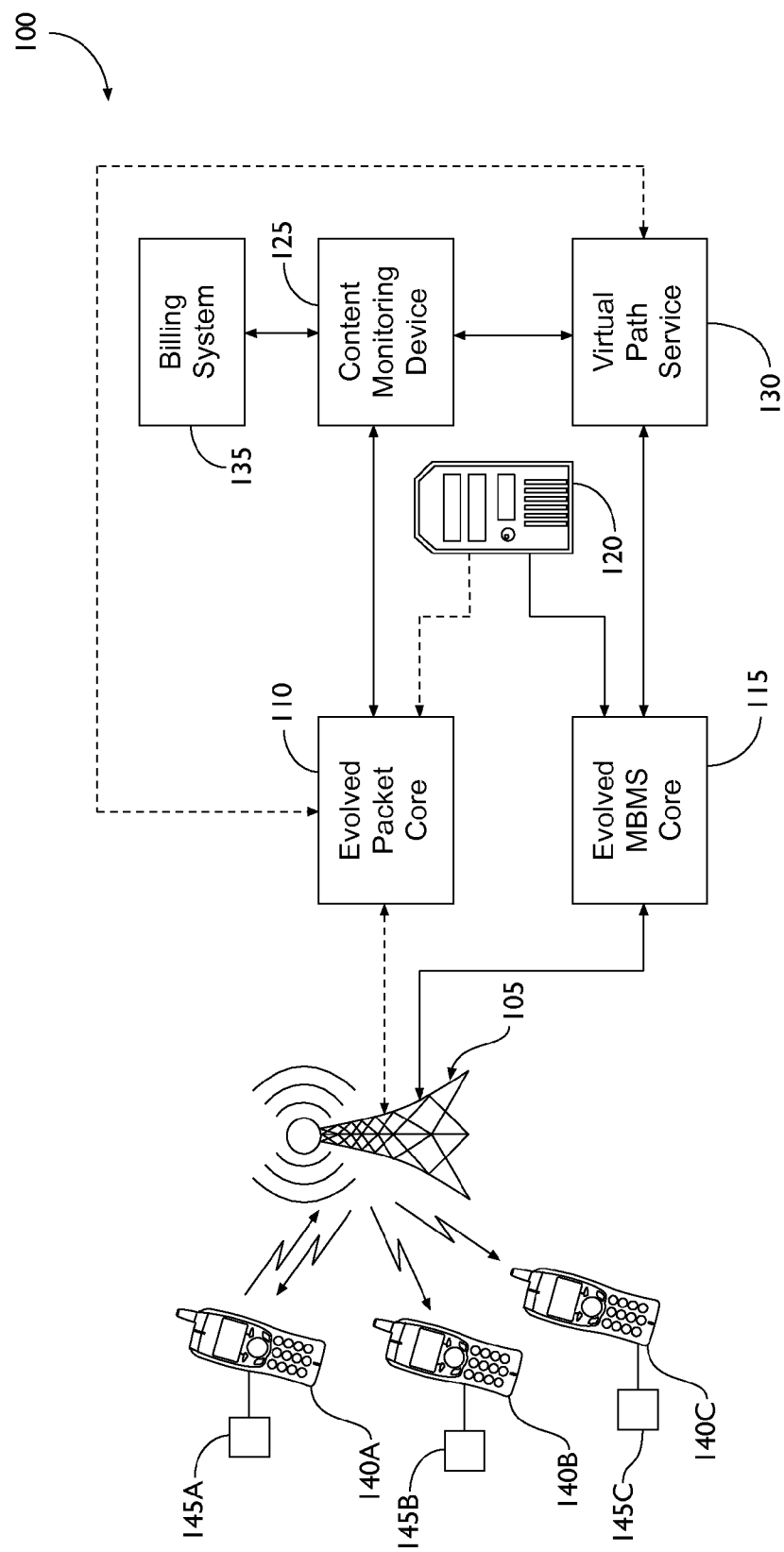

FIGS. 1A and 1B illustrate an exemplary system 100 configured to provide unicast (FIG. 1A) and broadcast (FIG. 1B) services to a telecommunication network. The system 100 may take many different forms and include multiple and/or alternate components and facilities. While an exemplary system 100 is shown, the exemplary components illustrated are not intended to be limiting. Indeed, additional or alternative components and/or implementations may be used.

As illustrated in FIGS. 1A and 1B, the system 100 includes a network device 105, an evolved packet core (EPC) 110, an evolved Multimedia Broadcast Multicast Service (eMBMS) core 115, a content database 120, a content monitoring device 125, a broadband virtual path service 130, and a billing system 135.

The network device 105 may be configured to communicate with a plurality of user devices (140A, 140B, and 140C, collectively 140). In one possible implementation, the network device 105 may include an evolved node B (eNodeB). While only one network device 105 is shown in FIG. 1, the system 100 may include any number of network devices 105. The network device 105 may be configured to receive data from and transmit data to any one or more of the user devices 140. The network device 105 may be configured to operate according to different modes of operation such as a unicast mode and a broadcast mode. When operating in unicast mode, the network device 105 may be configured to transmit unicast data to and receive unicast data from a particular user device 140A. To transmit unicast data, including unicast media content, to multiple user devices 140, the network device 105 may be configured to individually address data to each user device 140 that requested the data. As shown in FIG. 1A, only the user device labeled 140A has transmitted the request for the data and receives the data. The request for the data, including requests for media content, may be transmitted from the user device 140A to the network device 105 via a unicast-compliant signal. Likewise, the data may be transmitted from the network device 105 to the user device 140A via a unicast-compliant signal.

When operating in broadcast mode, the network device 105 may simultaneously transmit broadcast data, including broadcast media content, to multiple user devices 140, some of which may not have requested the media content. The broadcast of the media content may include consecutive broadcasts of the same instance of media content or broadcast of different media content at different times. As shown in FIG. 1B, only the user device 140A requested the data but the user devices 140A, 140B, and 140C, which may represent all user devices 140 within range of the network device 105, each receive the broadcast data. The network device 105 may be configured to broadcast media content to maximize the efficiency of network resources even though not all user devices 140 within range of the network device 105 have requested the media content. In other words, broadcasting the media content to all user devices 140 may be more efficient than transmitting the media content via unicast mode to only those user devices 140 that requested the content. Example situations where broadcasting media content may be more efficient include situations where a large number of user devices 140 have requested the same media content or where media content is not expected to be delivered immediately. For instance, some user devices 140 may subscribe to media content that is delivered periodically (e.g., weekly). The network device 105 may be configured to broadcast the media content according to a schedule and different network conditions. The schedule may designate desired times to broadcast the media content. For instance, the schedule may consider off-peak network communication times (e.g., at night), the age of the media content requested (e.g., older content is transmitted before newer content), etc. An example network condition may include the amount of network congestion at any particular time. Thus, the network device 105 may be configured to broadcast media content at times when network congestion is otherwise relatively low. By broadcasting according to the schedule and by considering network congestion, the broadcast of the media content may not significantly degrade network performance.

The network device 105 may be configured to switch modes of operation or to receive and transmit signals according to different modes of operation. For instance, the network device 105 may be configured to receive one or more unicast requests for media content, but broadcast the media content to the user devices 140, including to the user device 140A that sent the unicast request. Further, the network device 105 may be configured to operate in unicast mode to communicate with some user devices 140, such as the user device 140A, and broadcast mode to communicate with other or additional user devices 140, such as the user devices 140A, 140B, and 140C. For example, some user devices 140 may not be able to receive broadcast data. Thus, the network device 105 may be configured to transmit the media content in unicast mode to those user devices 140 that cannot process broadcast data and in broadcast mode to the user devices 140 that can process broadcast data. The network device 105 may be configured to determine which user devices 140 can process broadcast data based on signals received from each user device 140 when the user devices 140 registers with the network device 105. For instance, part of the registration process may include the user device 140 sending information to the network device 105 about the capabilities of the user device 140, including whether the user device 140 is able to receive broadcast data.

In some possible implementations, the network device 105 may be configured to delay transmission of the media content whether operating in unicast mode or broadcast mode. While the network device 105 may typically transmit the media content in unicast mode relatively quickly after receiving the request for the media content, the network device 105 may be configured to wait a predetermined amount of time after receiving the unicast request in case additional unicast requests for the same media content are received. If at least a predetermined number of unicast requests are received during the delay, the network device 105 may be configured to switch to broadcast mode to provide the media content. Whether the network device 105 receives the predetermined number of requests within the predetermined amount of time may be handled by the content monitoring device 125, which is discussed in greater detail below.

The evolved packet core 110 may include any number of components configured to facilitate communication of the media content to the user device 140. Some example components of the evolved packet core 110 may include a mobility management entity (MME), a serving gateway (SGW), and a packet data network (PDN) gateway, which may also be called a packet gateway (PGW). The mobility management entity may be configured to provide control plane functionality for mobility between different types of telecommunications networks. The serving gateway may be configured to route data packets while acting as a mobility anchor for the user plane. The packet gateway may be configured to provide an interface between different types of communication networks. The evolved packet core 110 may be implemented when the network device 105 is operating in unicast mode to facilitate unicast communication between the network device 105 and one or more of the user devices 140.

The eMBMS core 115 may include any number of components configured to facilitate broadcast communication, multicast communication, or both, between the network device 105 and multiple user devices 140. Exemplary components of the eMBMS core 115 may include a broadcast gateway (not shown) configured to provide an interface between the content database 120 and the network devices 105 and a service center (not shown) configured to handle logistics of broadcasting the media content to the user devices 140. The service center may be configured to schedule the broadcast of the media content so that the media content is broadcast at a particular time (e.g., off-peak times) or under certain network conditions such as when network congestion is low. Low network congestion may be defined by high quality-of-service (QOS), low packet loss, or the like. Network congestion may be measured in real time at the network device 105 or estimated based on historical information of the network device 105. Moreover, the network congestion may be estimated based on other circumstances such as whether an event, such as a sporting event, is drawing a large number of users and user devices 140 to a location near the network device 105 and increasing the network congestion of the network device 105. When network congestion is below a particular threshold, the service center may determine that network congestion relative to network device 105 is low. The service center may transmit the schedule and a signal representing network conditions to one or more of the network devices 105 operating in broadcast mode. Alternatively, the service center may consult the schedule and network conditions and instruct the network device 105 when to broadcast the media content.

The content database 120 may include any number of data storage devices configured to store media content and to make the media content accessible to the network device 105 through, e.g., either the evolved packet core 110 if the network device 105 is operating in unicast mode or eMBMS core 115 if the network device 105 is operating in broadcast mode. The media content may include audio content (music, podcasts, etc.), video content (movies, television shows, etc.), games, web pages, or the like. While only one content database 120 is shown, the system 100 may include any number of content databases 120.

The media content stored in the content database 120 may change over time. In one possible approach, the content database 120 may be configured to determine whether media content is being broadcast and only update the media content when the network device 105 is not operating in broadcast mode. In some possible implementations, the media content may be changed or deleted during the broadcast. If the media content is changed or deleted while the network device 105 is broadcasting the media content, the broadcast of the media content may stop and different media content may be broadcast instead. Alternatively, the network device 105 may switch to operate in unicast mode when the media content is no longer available for broadcast, such as if the media content is a broadcast of a live event (e.g., a breaking news event or a sporting event).

The content monitoring device 125 may include any number of computing devices configured to select the mode of operation of the network device 105 based on one or more conditions, such as the number of times a media content instance was requested, to maximize network resources. The content monitoring device 125 may be configured to count the number of requests for the media content instance received at the network device 105. The number of requests received may represent the popularity of a particular media content instance. Since more popular media content instances are downloaded more often, counting the number of requests for the media content instance may help determine whether efficiencies can be saved by broadcasting the media content instance in broadcast mode instead of individually providing the media content instance to each requesting user device 140 while in unicast mode. In one possible approach, the content monitoring device 125 may be configured to only count requests received within a predetermined period of time (e.g., within the last day, hour, minute, etc.), and the number of requests over a shorter time period may have more significance than the number of requests over a longer period of time. That is, the content monitoring device 125 may be configured to weight requests a number of requests received over a shorter period of time as more significant than the same or greater number of requests received over a longer period of time. By way of example only, the content monitoring device 125 may weight 10 requests received in a minute as more significant than 20 requests received in an hour.

The content monitoring device 125 may be configured to compare the number of requests for the media content instance received within a predetermined amount of time to a predetermined threshold that, e.g., may define the minimum number of requests where efficiencies may be gained by broadcasting the media content instance instead of transmitting the media content instance, in unicast mode, in response to each request. The value for the predetermined threshold may be based on several factors such as the total number of user devices 140 in communication with the network device 105, whether those user devices 140 can receive broadcast data, the location of the network device 105 (e.g., near a high-traffic area such as a sports stadium), current network conditions (e.g., whether there is a significant amount of network congestion), etc. With such factors, the same or different predetermined thresholds may be applied to each network device 105. Alternatively, the predetermined threshold may represent a rate at which requests are received relative to a certain period of time (e.g., 10 requests per minute). If the number of requests exceeds the predetermined threshold, the content monitoring device 125 may be configured to select the broadcast mode. If the number of requests is below the predetermined threshold, the content monitoring device 125 may select the unicast mode. The content monitoring device 125 may be configured to output a signal representing the selected operating mode. The content monitoring device 125 may be further configured to transmit a signal to each user device 140 instructing the user device 140 to tune in to a broadcast of the media content.

Counting requests for media content may include the content monitoring device 125 receiving the unicast request for the media content from the user device 140 via, e.g., the network device 105. The content monitoring device 125 may determine that the unicast request identifies a particular media content instance such as a video, music, game, application, or the like. The unicast request may identify the media content instance via an identifier such as a uniform resource locator (URL), the name of the media content instance, or a unique number or string of alphanumeric characters associated with the media content instance. The content monitoring device 125 may be configured to associate each identifier to a particular media content instance and increment a counter each time the identifier is received. This way, the number of identifiers received by the content monitoring device 125 may be used to determine the number of requests for each media content instance. The content monitoring device 125 may buffer requests for a predetermined amount of time or until a particular event (e.g., start of a live event, network congestion is low, or it is otherwise opportunistic to deliver the media content), and requests received within the predetermined amount of time are counted. When the number of requests meets or exceeds the predetermined threshold, the content monitoring device 125 may output a signal selecting the broadcast mode. Once broadcast mode is selected, the buffer that includes the number requests may be cleared. When the count is below the predetermined threshold, the content monitoring device 125 may select unicast mode either by outputting a signal or through omission if unicast mode is the default operating mode of the network device 105.

The content monitoring device 125 may be configured to monitor how many user devices 140 are consuming the broadcast media content 140 based on, e.g., signals sent from the user device 140 to the content monitoring device 125 via the network device 105. If the number of user devices 140 consuming the broadcast media content falls below a predetermine threshold, the content monitoring device 125 may output a signal to cause the network device 105 to operate in unicast mode, and thus, provide the media content instance directly to each user device 140 actively consuming the broadcast media content, even if the user device 140 did not initially request the media content.

The broadband virtual path service 130 may be configured to receive the signal representing the operating mode selected by the content monitoring device 125 and enable the network device 105 to transmit the media content according to the selected mode (e.g., either unicast mode or broadcast mode). In one possible implementation shown in FIG. 1A, the broadband virtual path service 130 may be configured to modify the network configuration according to the selected mode. That is, the network configuration may be modified so the media content is provided from the content server to the network device 105 through the evolved packet core 110 if the unicast mode is selected. Thus, in FIG. 1A, the dashed lines may represent signal paths that may not be used when the unicast mode is selected. If the broadcast mode is selected, the network configuration may be modified so the media content is provided from the content server to the network device 105 through the eMBMS core 115, as shown in FIG. 1B. The dashed lines in FIG. 1B may represent signal paths that are not needed when the network device 105 is operating in broadcast mode.

The virtual path service 130 may be configured to reject the operating mode selected by the content monitoring device 125. The virtual path service 130 may be configured to determine that the network device 105 is unable to operate in broadcast mode because of, e.g., a lack of resources available to broadcast the media content. In this or similar situations, the virtual path service 130 may be configured to reject the selection of broadcast mode from the content monitoring device and keep or modify the network configuration to reflect the unicast mode of operation shown in FIG. 1A.

The billing system 135 may be configured to bill one or more of the user devices 140 for accessing the media content instance. The billing system 135 may be configured to determine which user devices 140 have received and accessed the media content broadcast from the network device 105 (e.g., transmitted from the network device 105 while in broadcast mode). For instance, the billing system 135 may determine which user devices 140 in communication with the network device 105 are configured to receive broadcast data. Further, the billing system 135 may be configured to receive a signal, from the network device 105, indicating that the user device 140 has presented the media content instance to a user. The network device 105 may be configured to determine which user devices 140, if any, have accessed the broadcast media content based on signals received from each user device 105. The billing system 135 may be configured to bill each user device 140 that accessed the media content broadcast from the network device 105. Therefore, the user device 140 may be billed for the media content when the media content is accessed as opposed to when the media content is received. Media content transmitted via unicast mode may be billed either at the time the media content is transmitted to the user device 140 or when the user device 140 accesses the media content. In one possible approach, the billing system 135 may be configured to bill the user device 140 separately for requesting the media content, for downloading the media content through a broadcast or unicast communication, for accessing the media content, or any combination thereof. This way, the billing system 135 may charge different prices for the use of the network to transmit the media content to the user device 140 and for the licensing of the media content.

Additionally, the billing system 135 may be configured to price the media content according to the method of delivery. For instance, the price for broadcast media content may be lower than unicast media content since broadcast media content may be delayed relative to unicast media content. As discussed above, broadcast media content may be transmitted according to the schedule or at a time when network congestion is low while unicast media content may be transmitted relatively quickly (e.g., within a few minutes) in response to receiving the request for the media content. Broadcasts of media content associated with live events may occur in real-time as the event occurs. Broadcasts of other media content may, in some instances, be transmitted within a few hours or longer of the received requests. For instance, requests for media content that is released weekly (e.g., new episodes of television shows, new podcasts, releases of music albums, etc.) may be broadcast upon release of the media content to the public, which may be several days or weeks after the public is given the option to purchase or download the media content following, e.g., a pre-sale event or offer of a subscription to the media content. Non-live media content may be broadcast according to the schedule or when network congestion is low, as discussed above.

Although the billing system 135 is shown in communication with the content monitoring device 125, the billing system 135 may be configured to receive signals from additional or alternative system components. For instance, the billing system 135 may be configured to receive signals indicating whether a particular user device 140 has accessed particular media content from the network device 105 or from the user device 140.

Each user device 140 may be configured to transmit data, such as unicast-compliant data, and receive unicast-compliant data, broadcast data, or both. To receive broadcast media content, the user device 140 may be configured to receive an instruction from the content monitoring device 125 via, e.g., the network device 105 to tune in to a particular broadcast of the media content. Otherwise, the user device 140 may be configured to default to communications received and transmitted via unicast-compliant signals. The user devices 140 may each include a memory device 145A, 145B, and 145C (collectively, 145) configured to store data locally at the user device 140. In some possible implementations, the memory device 145 may provide temporary storage of media content as it is being broadcast, including for a relatively short amount of time thereafter. After the broadcast is complete, the user device 140 may delete the broadcasted media content from the memory device 145. Alternatively or in addition, the memory device 145 may be configured to store the broadcasted media content for longer periods of time, such as until it is manually deleted or replaced by other broadcasted media content.

In some possible approaches, the user device 140 may be configured to download the media content at the time it is broadcast to maximize the efficiency of network resources but initially hide the broadcasted media content from a user until the user inputs a desire to access the broadcasted media content (e.g., the user instructs the user device 140 to request the media content from the network device 105) or until the user pays for the media content via, e.g., the billing system 135. Therefore, the memory device 145 may store the broadcasted media content on the user device 140 even though the user device 140 did not request the media content. The user device 140 may make the media content available after the user device 140 generates a request for the media content, however. In some instances, the user device 140 may be configured to receive and store broadcast media content if sufficient memory is available on the user device and downloading the broadcast media content will not significantly alter battery life. That is, the user device 140 may store broadcast content without requesting the content when the user device 140 has, e.g., at least 50% battery charge or is receiving power from another power source, such as a wall charger.

The user device 140 may be configured to receive a download command from the network device 105 instructing the user device 140 to store broadcast media content that was not requested by the user device 140. Based on information about the user or the user device 140, such as other media content downloaded, demographics of the user, the type of user device 140 (tablet computer, smartphone, etc.), or other factors, the network device 105 may be configured to determine the likelihood that the user would want a particular broadcast media content instance yet for some reason has failed to request the media content. This may occur if the user is unaware of the release of the media content instance or simply forgot to request the media content instance. The download command may instruct the user device 140 to store the broadcast media content. Additionally or in the alternative, the download command may cause the user device 140 to prompt the user to select whether the broadcast media content should be downloaded. The user device 140 may be configured to delete the stored media content received through a broadcast upon receipt of a delete command received from the user or from the network device 105. The ability to delete broadcast media content via a delete command may apply whether or not the broadcast media content was requested by the user device 140 or downloaded automatically in the interest of maximizing the efficiency of network resources.

In general, computing systems and/or devices, such as the network device 105, the evolved packet core 110, the eMBMS core 115, the content database 120, the content monitoring device 125, the broadband virtual path service 130, the billing system 135, and the user devices 140, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
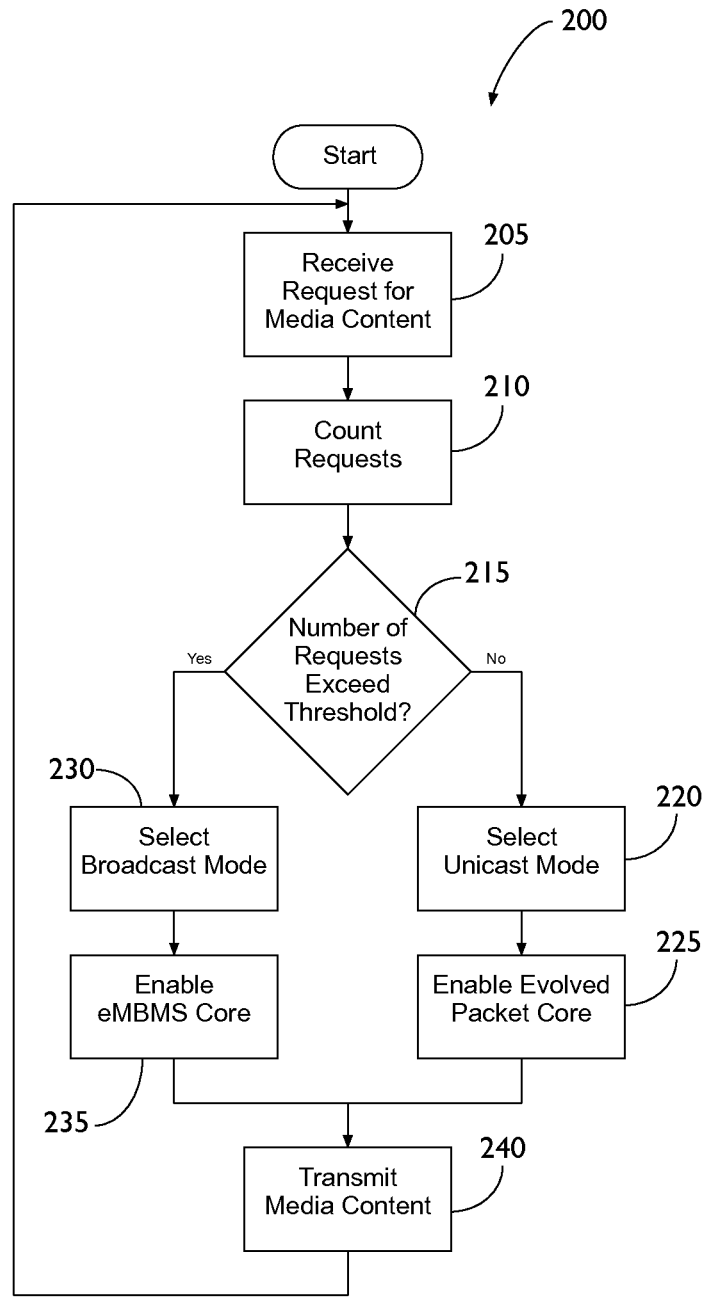
FIG. 2 illustrates an exemplary flowchart of a process that may be implemented by the system of FIG. 1.

FIG. 2 represents an exemplary process 200 that may be implemented by one or more components of the system 100 of FIG. 1.

At block 205, the network device 105 may receive a request for media content from at least one user device 140. In one possible implementation, the request may be made via a unicast signal transmitted from a user device 140 to the network device 105. The communication between the network device 105 and the user devices 140 relative to requesting media content may therefore be made while the network device 105 is operating in the unicast mode. Further, the network device 105 may receive any number of requests made from any number of user devices 140.

At block 210, the content monitoring device 125 may count the number of requests for media content received at the network device 105. The number of requests received may represent the popularity of a particular media content instance. Since more popular media content instances are downloaded more often, counting the number of requests for the media content instance may help determine whether efficiencies can be saved by broadcasting the media content instance in broadcast mode instead of providing the media content instance directly to each requesting user device 140 while in unicast mode.

At decision block 215, the content monitoring device 125 may compare the number of requests for the media content instance to a predetermined threshold. The predetermined threshold may define the minimum number of requests where efficiencies may be gained by broadcasting the media content instance instead of transmitting the media content instance in unicast mode in response to each request. If the number of requests is below the predetermined threshold, the process 200 may proceed at block 220. If the number of requests exceeds the predetermined threshold, the process 200 may proceed at block 230.

At block 220, the content monitoring device 125 may select the unicast mode of operation for the network device 105. The content monitoring device 125 may output a signal to the broadband virtual path service 130 indicating that the unicast mode of operation was selected.

At block 225, the broadband virtual path service 130 may enable the network device 105 to provide the media content according to the unicast mode of operation. For instance, the broadband virtual path service 130 may modify the network to include the evolved packet core 110 to transmit the media content from the content server to the network device 105. The process 200 may continue at block 240 after block 225.

At block 230, the content monitoring device 125 may select the broadcast mode of operation for the network device 105. The content monitoring device 125 may output a signal to the broadband virtual path service 130 indicating that the broadcast mode of operation was selected.

At block 235, the broadband virtual path service 130 may enable the network device 105 to provide the media content according to the broadcast mode of operation. For instance, the broadband virtual path service 130 may modify the network to include the eMBMS core 115 to transmit media content from the content server to the network device 105.

At block 240, the network device 105 may transmit the media content according to the selected mode. If the unicast mode was selected, the network device 105 may individually address the media content to each user device 140 that requested the media content. If the broadcast mode was selected, the network device 105 may simultaneously transmit the media content to multiple user devices 140, some of which may not have requested the media content. The process 200 may return to block 205 so that the selection of the mode may be modified as, e.g., the number of requests for the media content instance change over time.

Figure 3:
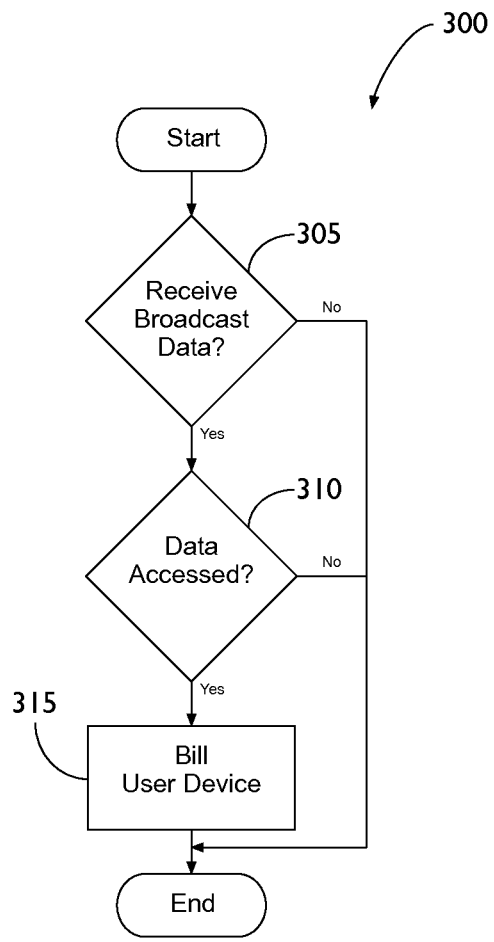
FIG. 3 illustrates an exemplary flowchart of another process that may be implemented by the system of FIG. 1.

FIG. 3 illustrates a flowchart of an exemplary process 300 that may be implemented by the billing system 135 of FIG. 1 when the network device 105 is operating in the broadcast mode so that only user devices 140 that access the broadcasted media content are billed. Thus, it is possible that not all user devices 140 that receive the broadcasted media content will be billed for the media content. In one possible approach, the process 300 may be performed for each user device 140 in communication with the network device 105 while the network device 105 is in broadcast mode.

At decision block 305, the billing system 135 may determine whether the user device 140 received the media content transmitted from the network device 105 in accordance with the broadcast mode. For instance, the billing system 135 may determine whether the user device 140 was within broadcast range of the network device 105 and able to receive and process broadcast data. If so, the process may continue at block 310. If not, the process may end.

At decision block 310, the billing system 135 may determine whether the user has accessed the broadcasted media content. For example, the billing system 135 may receive a signal from the network device 105, the content database 120, or the content monitoring device 125 indicating that the user device 140 has presented the media content instance to a user. If the user device 140 has accessed the media content, the process 300 may continue at block 315. If not the process 300 may end.

At block 315, the billing system 135 may bill the user device 140 for accessing the broadcasted media content. Billing the user device 140 may include applying a price to the media content. As discussed above, the price of the media content may change according to the method of delivery. For instance, the price for broadcast media content may be lower than unicast media content since broadcast media content may be delayed relative to unicast media content. Because the process 300 may be implemented for broadcast communications, the billing system 135 may set the price of the accessed media content accordingly.

With the system 100 and processes 200 and 300 described above, certain efficiencies may be gained by broadcasting the media content (e.g., operating the network device 105 in broadcast mode) instead of transmitting the media content directly to each device that requests the media content (e.g., operating the network device 105 in unicast mode). Moreover, the broadcast of the media content may be according to a schedule and may consider various network conditions to further maximize network resources when delivering the requested media content.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
 a network device configured to receive a request for media content from a plurality of user devices and transmit the media content in accordance with at least one of a unicast mode and a broadcast mode;
 a content monitoring device configured to at least count a number of requests for media content received at the network device and select the mode of the network device based on the number of requests received at the network device; and
 a broadband virtual path service configured to receive the mode selected by the content monitoring device and enable the network device to transmit the media content in accordance with at least one of the unicast mode and the broadcast mode.

2. The system of claim 1, wherein the number of requests is determined over a predetermined time period and wherein the content monitoring device is configured to apply a greater weight to requests received over a shorter time period than a same or greater number of requests received over a longer time period.

3. The system of claim 1, wherein the network device is configured to receive the requests for media content in accordance with a unicast mode and transmit the media content in response to at least some of the requests in accordance with a broadcast mode.

4. The system of claim 1, wherein the broadband virtual path service is configured to modify a network configuration to include an evolved packet core to transmit media content in accordance with the unicast mode and an evolved Multimedia Broadcast Multicast Service core to transmit media content in accordance with the broadcast mode.

5. The system of claim 1, further comprising a billing system configured to determine which user devices have received the media content transmitted from the network device in accordance with the broadcast mode.

6. The system of claim 5, wherein the billing system is configured to bill only the user devices that accessed the media content transmitted from the network device in accordance with the broadcast mode.

7. The system of claim 1, wherein the content monitoring device is configured to select the broadcast mode if the number of requests exceeds a predetermined threshold and the unicast mode if the number of requests is below the predetermined threshold.

8. The system of claim 1, wherein the network device is configured to transmit the media content in accordance with the unicast mode by individually addressing the media content to each user device that requested the media content.

9. The system of claim 1, wherein the network device is configured to transmit the media content in accordance with the broadcast mode by simultaneously transmitting the media content to multiple user devices in communication with the network device.

10. The system of claim 9, wherein the media content is stored generally simultaneously on the multiple user devices, and wherein the stored media content is initially hidden from at least one of the user devices.

11. The system of claim 10, wherein the hidden media content is made available to the at least one of the user devices after the at least one of the user devices requests the media content.

12. The system of claim 1, wherein the network device is configured to transmit the media content according to a schedule when operating in the broadcast mode.

13. The system of claim 1, wherein the network device is configured to delay transmission of the media content until network congestion is low when operating in the broadcast mode.

14. The system of claim 1, wherein the network device is configured to transmit the media content to a first subset of the plurality of user devices according to the unicast mode and to a second subset of the plurality of user devices according to the broadcast mode, wherein each of the first subset and the second subset includes fewer than all of the plurality of user devices.

15. A method comprising:
receiving at a network device a request for media content from a plurality of user devices;
counting a number of requests for media content received at the network device;
selecting at least one of a unicast mode and a broadcast mode of the network device based on the number of requests received at the network device;
transmitting a signal representing the selected mode to a broadband virtual path service; and
enabling the network device to transmit the media content in accordance with at least one of the unicast mode and the broadcast mode; and
transmitting the media content in accordance with the selected mode.

16. The method of claim 15, further comprising:
receiving the requests for media content at the network device in accordance with a unicast mode; and
transmitting the media content from the network device in response to at least some of the requests in accordance with a broadcast mode.

17. The method of claim 15, wherein enabling the network device to transmit the media content in accordance with at least one of the unicast mode and the broadcast mode includes:
modifying a network configuration to include an evolved packet core to transmit media content in accordance with the unicast mode; and
modifying the network configuration to include an evolved Multimedia Broadcast Multicast Service core to transmit media content in accordance with the broadcast mode.

18. The method of claim 15, further comprising determining which user devices have received the media content transmitted from the network device in accordance with the broadcast mode.

19. The method of claim 18, further comprising billing only the user devices that accessed the media content transmitted from the network device in accordance with the broadcast mode.

20. The method of claim 15, wherein the broadcast mode is selected upon the number of requests exceeding a predetermined threshold and the unicast mode is selected upon the number of requests being below the predetermined threshold.

21. The method of claim 15, wherein transmitting the media content in accordance with the unicast mode includes individually addressing the media content to each user device that requested the media content; and
wherein transmitting the media content in accordance with the broadcast mode includes simultaneously transmitting the media content to multiple user devices in communication with the network device.

22. A system comprising:
a content database storing media content;
a network device configured to receive a request for media content from a plurality of user devices and transmit the media content in accordance with at least one of a unicast mode and a broadcast mode;
a content monitoring device configured to count a number of requests for media content received at the network device and select the mode of the network device based on the number of requests received at the network device;
a broadband virtual path service configured to receive the mode selected by the content monitoring device and enable the network device to transmit the media content in accordance with at least one of the unicast mode and the broadcast mode, wherein the broadband virtual path service is configured to modify a network configuration to include an evolved packet core to transmit media content in accordance with the unicast mode and an evolved Multimedia Broadcast Multicast Service core to transmit media content in accordance with the broadcast mode; and
a billing system configured to determine which user devices have received the media content transmitted from the network device in accordance with the broadcast mode and to bill only the user devices that accessed the media content transmitted from the network device in accordance with the broadcast mode.

23. The system of claim 22, wherein the network device is configured to transmit the media content to a first subset of the plurality of user devices according to the unicast mode and to a second subset of the plurality of user devices according to the broadcast mode, wherein each of the first subset and the second subset includes fewer than all of the plurality of user devices.

* * * * *